JAMES DUNNING.
Improvement in Ice Preservers.
119,016. Patented Sep. 19, 1871.
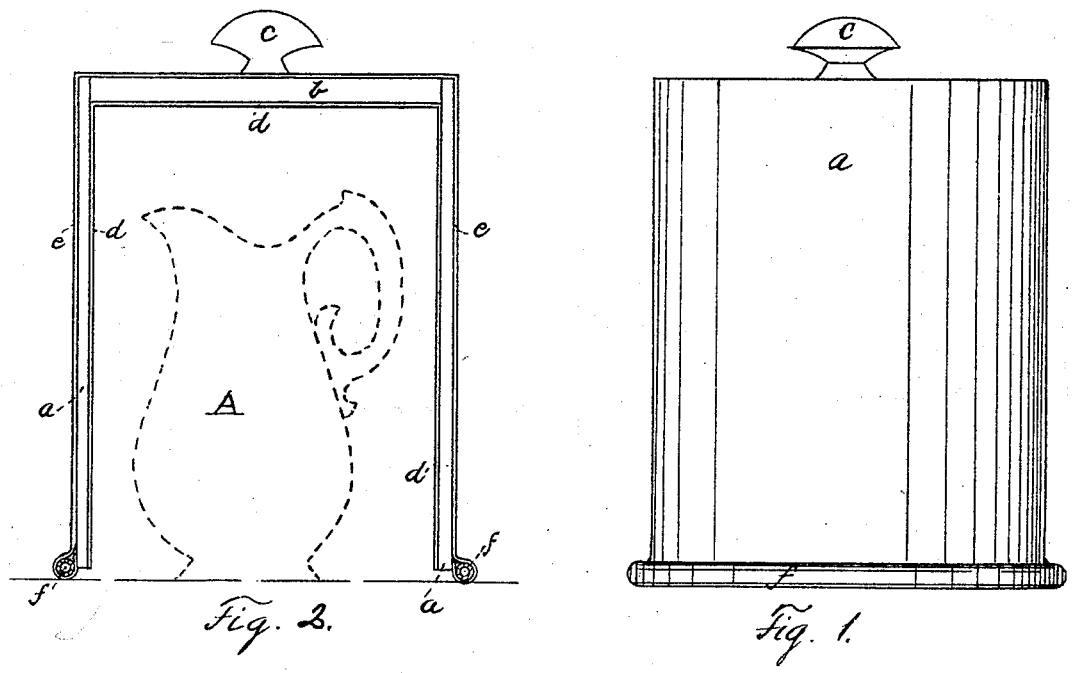
Witness
Inventor
James Dunning
Per Wm. Franklin Leavy, Atty.

UNITED STATES PATENT OFFICE.

JAMES DUNNING, OF BANGOR, MAINE.

IMPROVEMENT IN ICE-PRESERVERS.

Specification forming part of Letters Patent No. 119,016, dated September 19, 1871.

*To all whom it may concern:*

Be it known that I, JAMES DUNNING, of Bangor, in the county of Penobscot and State of Maine, have invented a new and useful Improved Ice-Preserver; and I hereby declare the following to be a full, clear, and exact description thereof, which will enable others to make and use the same, reference being had to the accompanying drawing forming a part of this specification, in which—

Figure 1 shows a side elevation, and Fig. 2 a section of my invention.

Same letters show like parts.

My object is to produce a cheap and convenient device for family use, for keeping and preserving ice, ice-water, &c., preventing its melting or becoming warm in hot weather. My invention consists of a cylinder which may be placed over the pitcher or other vessel which it is desired to keep cool. This cylinder is made of straw, woolen or cotton felt, or kindred material, and is lined within and covered without with flannel. The inner lining is preferably of white. The top is made of wood to give form to the cylinder, and has a handle for convenience in raising it. Previous to lining with flannel the felt or kindred material, of which the cylinder is made, is coated with shellac or varnish, by which the pores are closed and its utility increased. A rubber tube around the bottom is an advantage, adapting itself to the inequalities of the surface upon which it rests and excluding the air perfectly.

In the drawing, $a$ shows the cylinder; $b$, the top; $c$, the handle; $d$, the inner, and $e$ the outer lining. In the section, A represents the vessel containing the liquid to be kept cool, showing the manner in which the device is used. At $f$ is shown the rubber-tube; its effect in practice is to check evaporation, so that the inside of the preserver does not become moist or wet and thereby subject to mold. Its convenience in private families or in the sleeping rooms of hotels and like places is evident.

What I claim as my invention, and desire to secure by Letters Patent, is—

As a new article of manufacture, the ice-preserver described, consisting of the cylinder $a$, top $b$, the inner and outer linings $d$ $c$, and the tube $f$, substantially as specified.

JAMES DUNNING.

Witnesses:
WM. FRANKLIN SEAVEY,
JOHN W. RICKER. (51.)